Oct. 7, 1958   A. P. DOUGLAS ET AL   2,855,218
BOY'S BICYCLE FRAME AND SEAT POST CLUSTER CONSTRUCTION
Filed June 20, 1957   2 Sheets-Sheet 2
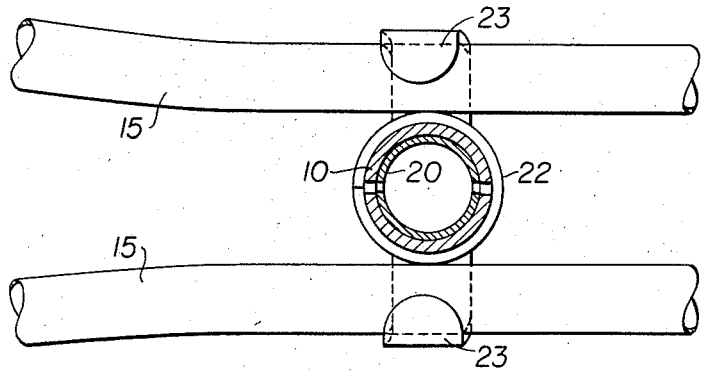
Fig. 2
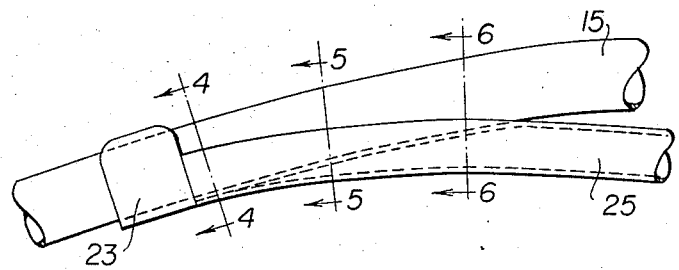
Fig. 3
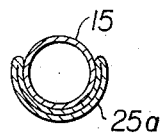   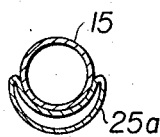   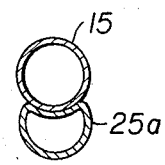
Fig. 4        Fig. 5        Fig. 6
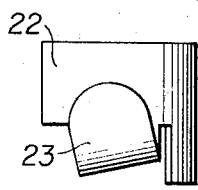   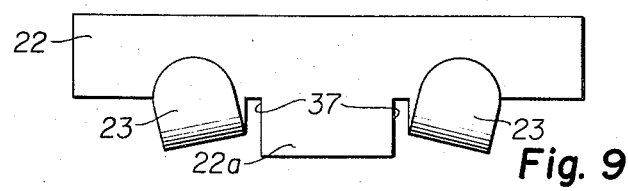
Fig. 7                             Fig. 9
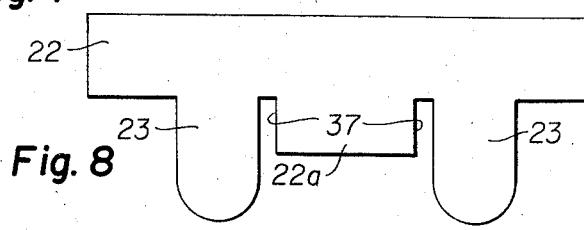
Fig. 8
INVENTORS
ALVIN P. DOUGLAS
GILBERT B. HAHN
BY Gobrick & Gobrick
ATTORNEYS

United States Patent Office 2,855,218
Patented Oct. 7, 1958

2,855,218

BOY'S BICYCLE FRAME AND SEAT POST CLUSTER CONSTRUCTION

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application June 20, 1957, Serial No. 666,884

3 Claims. (Cl. 280—281)

This invention is directed to improvements in boys' bicycle frame constructions and is concerned primarily with a tubular frame seat post cluster construction.

More specifically the invention is concerned with a seat post cluster construction of a unitarily brazed formation constituting the equivalent of an eight tube cluster joint.

Another object is the provision of a bicycle construction wherein the upper tube reaches of the frame are twin or left and right tubes forming the forward upper reach, the upper rear fork and a two tube forward strut construction joined to the mast tube in such manner as to permit the right and left hand tubes to extend continuously from the rear axle clip plates to the head tubes.

A further object is the provision of a boy's bicycle frame construction of a twin tube type which may be assembled and simultaneously brazed throughout all of the connections and joints thereof while retaining its preassembled shape.

Other objects and advantages will appear from the description and drawings wherein:

Fig. 2 is a top plane view of the frame shown in Fig. 1;

Fig. 3 is a fragmentary view of the jointure of strut tubes with reach bar tubes of the frame at the seat post cluster;

Figure 1:
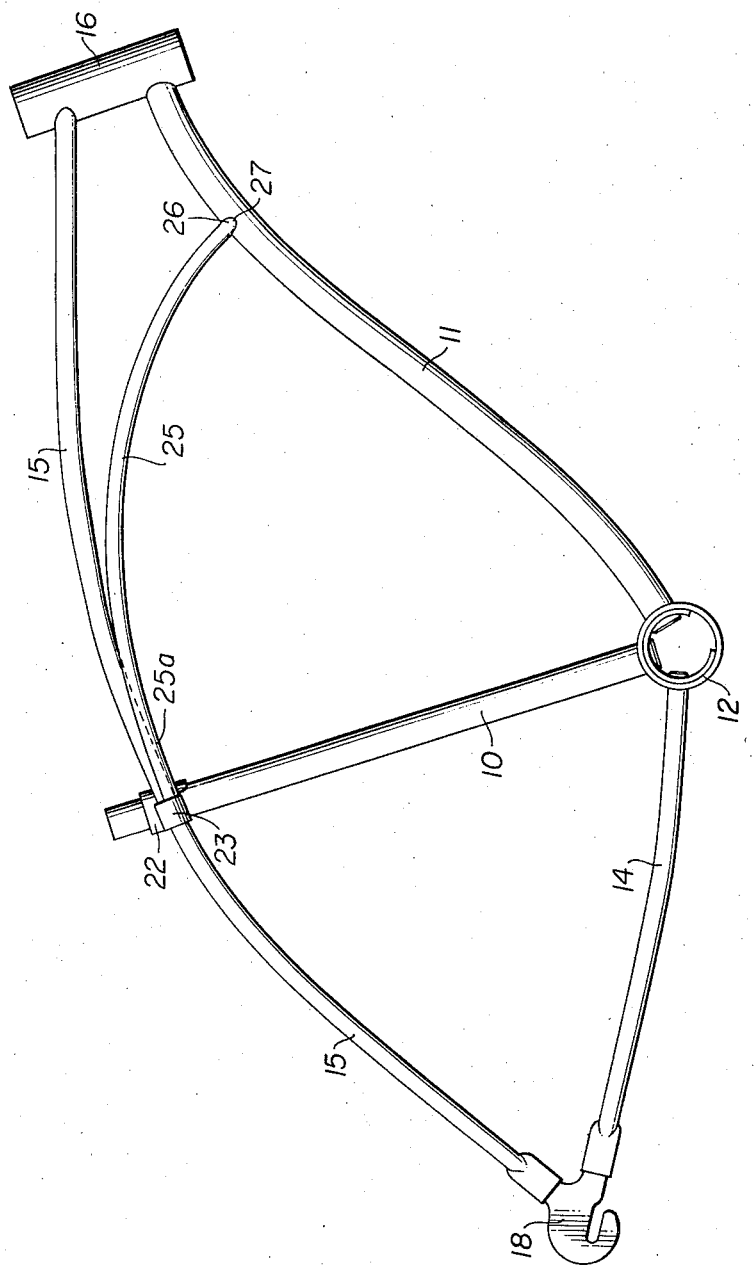
Fig. 1 is a side elevation of a bicycle frame incorporating our invention.

Figs. 4, 5 and 6 are cross sections of the jointure shown in Fig. 3 and taken along planes indicated by the lines 4—4, 5—5 and 6—6 of Fig. 3;

Fig. 7 is a view of a seat post cluster sleeve; and

Figs. 8 and 9 illustrate steps in the method followed in forming the seat post cluster sleeve shown in Fig. 7.

The present invention arises in the art of manufacturing bicycle frames so constructed that all of the joints or tubular connections of the frame are effected in a preassembly manner and thereafter the joints and connections are copper brazed simultaneously by passing the preassembled frames through a hydrogen furnace at a temperature above the melting point of brazing copper.

The drawings show a so-called twin tube frame construction the only single tubes being the seat post mast tube 10 and front lower reach tube 11 press fitted in openings formed in the cylindrical wall of a hanger housing 12. The frame structure includes usual lower rear fork tubes 14 also press fitted in appropriate openings formed in the hanger housing 12.

The upper forward reach comprises right and left or twin tubes 15 which are individually joined to a head or front fork bearing tube 16 and extend rearwardly past the sides of the seat post mast tube 10 to the rear axle clip plates 18 to which the rear ends of the tubes 15 are joined as are also the lower rear fork tubes 14. The forward ends of the tubes 15 are individually joined to the head tube 16 in suitably horizontally spaced openings formed in the head tube 16 and the front lower reach tube 11 is similarly joined to the head tube.

The seat post cluster structure comprises the mast tube 10, an inner tube 20 the internal diameter of which approximates the external diameter of a seat post not shown. The tube 20 extends downwardly within the mast tube to a point below the disposition of the twin tubes 15 and extends upwardly the height of the upper end of the mast tube a sufficient distance to receive a split clamping collar, the protruding ends of the tubes 10 and 20 being split to contract upon the seat post.

Tightly embracing the mast tube is a twin tube support or saddle in the form of a cylindrically shaped collar 22 having integrally formed depending socket troughs 23 tilted in the direction of extension of the twin tubes 15. These troughs are substantially U-shaped until the twin tubes 15 are placed therein and then the outer legs are formed inwardly over the tubes 15. These troughs are in equally spaced relation to the center of the mast tube and are slanted relative to the mast tube as viewed in Fig. 7 and in the side elevation of the frame.

The forepart of the frame has two strut tubes 25 connecting the lower forward reach tube 11 and the seat post cluster structure. These tubes 25 are formed to arch upwardly from the front connection 26 with the reach tube 11 to the undersides of the twin tubes 15 as shown in Figs. 3, 4, 5 and 6, the upper end portions 25a of the tubes 25 being flattened and concavely formed to embrace the under halves of the surfaces of the twin tubes as illustrated in the cross sectional Figs. 4, 5 and 6 so that the upper end edges of the tubes 25 are in abutting relation with the forward edges of the troughs or sockets 23, the trough formations being spaced outwardly from the cylindrical formation 22 of the saddle structure to provide space for such abutment.

The front end edges of the strut tubes 25 are concavely shaped to fit the round shape of the front reach tube 11 when the forward ends thereof are spaced apart at the connection 26 as shown in Fig. 9. The joint consists of spot welds 27 and a subsequent copper bond formed at the time all of the frame joints and connections are simultaneously brazed. During this brazing operation the concaved end portions (25a) of the strut tubes are brazed to the undersides of the twin tubes 15 at the seat post cluster structure and the abutments with the forward edges of the troughs 23. In this operation the sleeve 22, the tube 20 and mast tube 10 are brazed to each other as well as the trough formations 23 to the respective twin tubes 15. Thus the seat post cluster construction consists of the equivalent of eight tubular joints namely the mast tube 10, the insert tube 20, the upper ends of the strut tubes 25, the cylindrically formed saddle structure 22—23, the upper rear fork tube extensions of tubes 15, the upper front reach tube portions 15 joined in the trough formations.

The forward ends of the strut tubes 25 are cut to the proper contour to form a surface brazed joint with the lower front reach tube 11 by placing the tubes in a fixture and drilling or reaming the end edges to fit the annular contour of the reach tube 11 while in spaced apart relation.

As will be seen in Fig. 8 a single blank with cut out slots 37 can have the tilted lugs formed into U-shaped portions 23 as shown in Fig. 9 leaving a downward extension 22a therebetween. The body of the blank is then curled into cylindrical shape to tightly fit the mast tube 10 and the portions 23 are disposed in a rearwardly slanting direction on opposite sides of the cluster structure. The blank slots 37 permit of this slanting formation and also afford clearance for the ends of the strut tubes 25 to abut the forward edges of the trough formations. After the continuous tubes are placed in the trough formations of the cluster structure, the outer legs of the U-formations are curled inwardly over the top surfaces of the continuous tubes 15. The strut tubes 25 may then be held in place in abutting relation to the cluster structure and the connections or joints 26 are then preliminarily formed by spot weld nibs until the final brazing operation wherein the concaved surfaces of the upper ends of the strut tubes are brazed to the cluster and to the undersides of the tubes 25 while the milled forward ends of the strut tubes are brazed to the reach tube 11.

We claim:

1. In a bicycle frame construction having a single seat post mast tube, a hanger housing joined to the bottom of the mast tube, a head fork bearing tube, a front lower reach tube connecting the head fork bearing tube and the hanger housing, rear axle clip plates and a pair of continuous tubes extending from the rear axle clip plates to the head tube: a seat post cluster construction on the upper portion of the mast tube comprising a sleeve intimately embracing the mast tube and having formed thereon trough like socket portions with the trough opening extending upwardly, said pair of continuous tubes forming the upper front reach of the frame and individually joined at their forward ends to the head fork bearing tube and extending from the rear axle clip plates to the head tube through said trough sockets and a pair of auxiliary tubes connected directly to the said front lower reach tube and concavely formed at the upper end portions thereof to merge with the undersides of the continuous tubes and joined to the continuous tubes and in abutting relation to the trough socket formations.

2. In a bicycle frame having continuous right and left tubes forming the upper front reach bars, a seat post cluster structure comprising a mast tube, a saddle structure intimately surrounding the mast tube, said saddle structure having rearwardly sloping trough formations disposed equidistantly on each side of the center of the mast tube, said right and left continuous tubes passing from rear to front of the mast tube, the cluster structure including concavely formed ends of forward strut tubes fixed directly to the lower front reach tube of the frame with each rear end portion concavely engaged with the undersides of the continuous tubes and the ends of the strut tubes being in abutting relation to the forward ends of the trough formations at the seat post cluster structure.

3. In a bicycle frame construction having a single seat post mast tube, a hanger housing joined to the bottom of the mast tube, a head fork bearing tube and a front lower reach tube connecting the head fork bearing tube and the hanger housing, and rear axle clip plates: a seat post cluster construction on the upper end of the mast tube comprising a sleeve intimately embracing the mast tube and having depending therefrom trough like socket portions, a pair of continuous tubes forming the upper front reach of the frame and separately joined at their forward ends to the head fork bearing tube in separate horizontally spaced openings in the head tube and extending from the rear axle clip plates to the head tube through said trough like socket portions and a second pair of tubes connected to the said front lower reach bar and concavely formed at the upper end portions thereof to merge with the undersides of the continuous tubes and terminate in abutting relation to the forward edges of the said trough like socket formations.

References Cited in the file of this patent

UNITED STATES PATENTS

| | | |
|---|---|---|
| 2,550,941 | Schuricht | May 1, 1951 |
| 2,666,478 | Schwayder | Jan. 19, 1954 |
| 2,755,103 | Douglas | July 17, 1956 |

FOREIGN PATENTS

| | | |
|---|---|---|
| 402,814 | France | Sept. 8, 1909 |
| 992,099 | France | July 4, 1949 |
| 1,025,770 | France | Jan. 28, 1953 |